Oct. 15, 1963    H. HACK    3,106,846
BALANCING MACHINE
Filed July 14, 1958    4 Sheets-Sheet 1

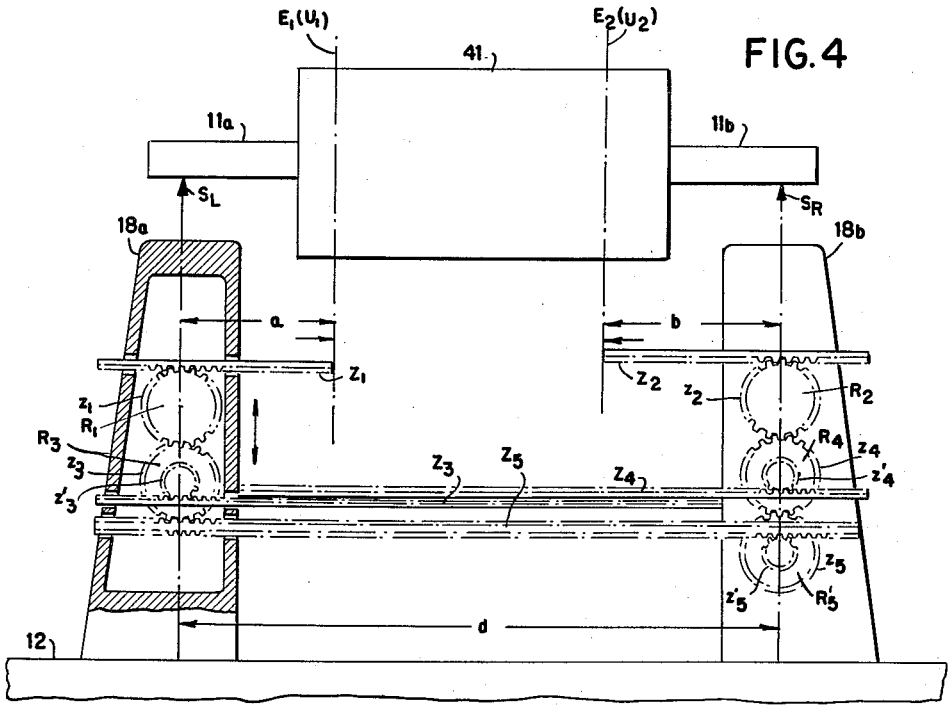
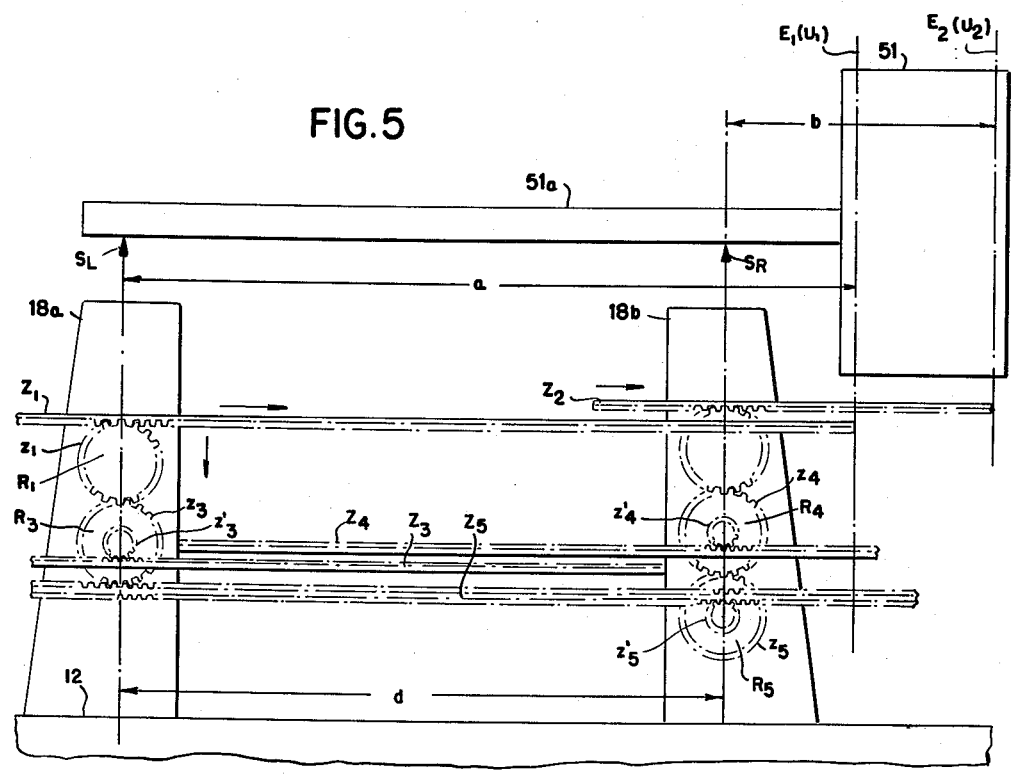

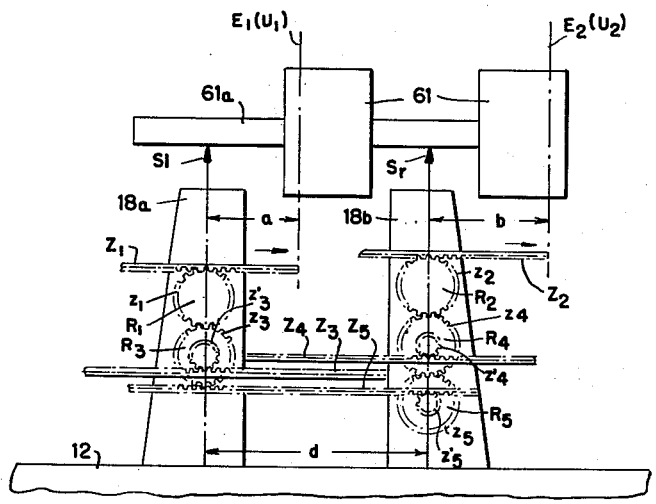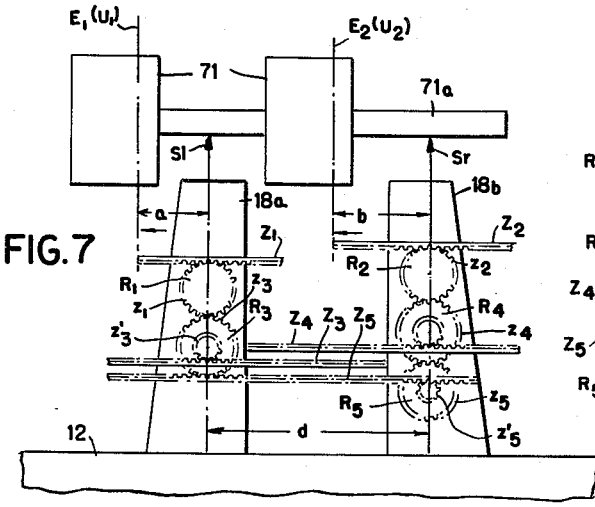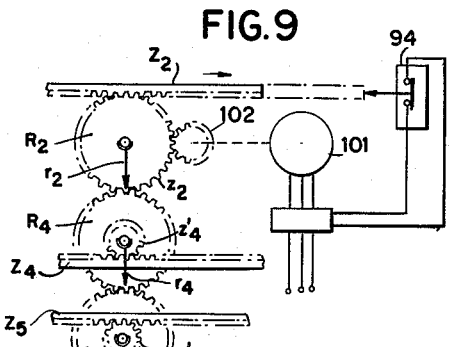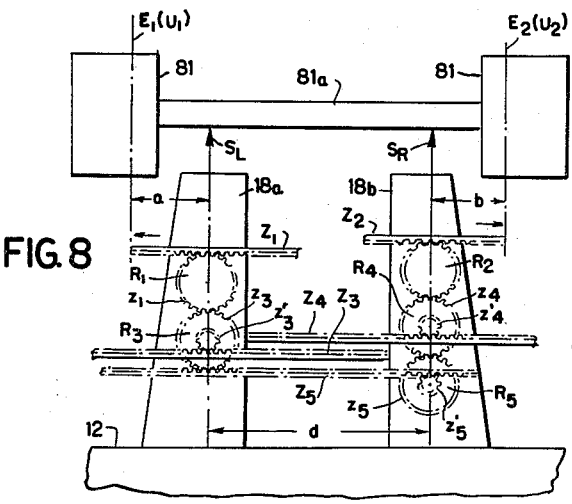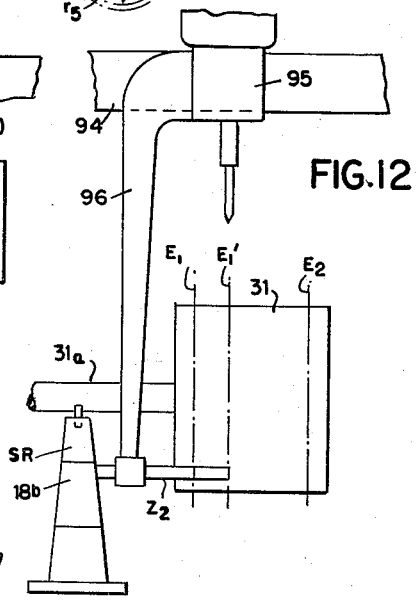

United States Patent Office 3,106,846
Patented Oct. 15, 1963

3,106,846
BALANCING MACHINE
Heinrich Hack, Darmstadt, Germany, assignor to Carl Schenck Maschinenfabrik G.m.b.H., Darmstadt, Germany, a corporation of Germany
Filed July 14, 1958, Ser. No. 748,445
Claims priority, application Germany July 15, 1957
12 Claims. (Cl. 73—463)

My invention relates to machines for balancing rotatable workpieces and has for its main objects to simplify the design, expedite the operation and improve the accuracy of the devices required for translating the observable unbalance-responsive oscillations of the workpiece into the desired data indicative of the unbalance components in one or more predetermined planes of reference.

Another object is to devise a balancing machine which can readily be set for accommodating and balance-analyzing a variety of workpieces of respectively different size, design, or type of journalling, and which, when changed to a different setting, automatically controls the balance-analyzing instrumentalities to properly and accurately respond to the changed conditions.

To achieve these objects, and in accordance with a feature of my invention, I provide a balancing machine with oscillatingly supported workpiece-journal bearings that are displaceable as regards their mutual spacing parallel to the journal axis for the purpose of adapting the machine to a variety of different workpieces, and I provide the electric or other balance-analyzing equipment of the machine with adjustable control or compensating means so connected with the respective journal bearings as to go along with any change in setting of the bearings, thus automatically calibrating the balance-analyzing equipment for any such change.

These, as well as other objects, advantages and features of my invention, will be described in conjunction with the embodiments illustrated by way of example on the accompanying drawings in which:

FIGS. 4 to 8 are diagrammatical and partly sectional illustrations relating to several different ways of journalling a workpiece on a balancing machine according to FIGS. 1, 2 or FIG. 3.

FIG. 9 shows a modified detail of such a machine.

Figure 1:
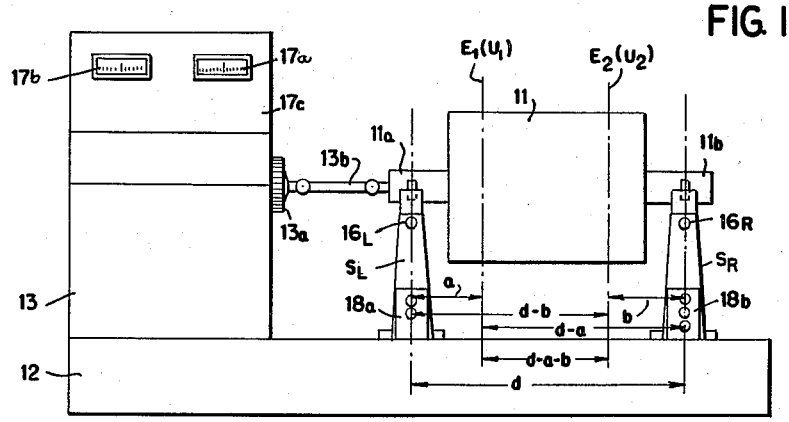
FIGS. 1 and 2 show respectively a front view and a lateral view of a dynamic balancing machine.
Figure 2:
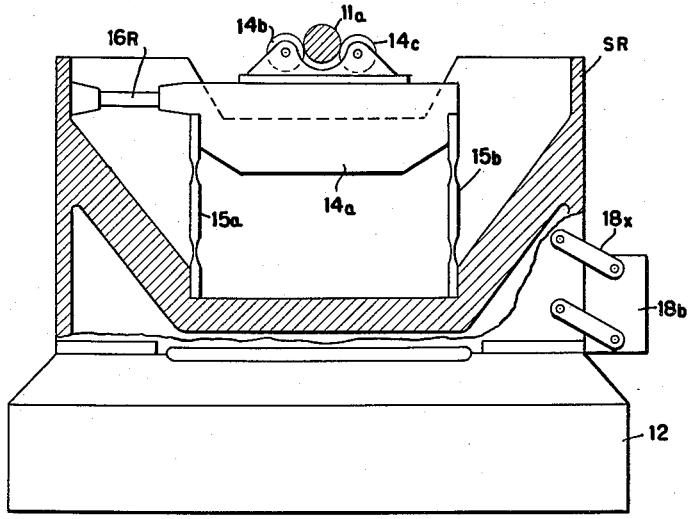
Figure 11:
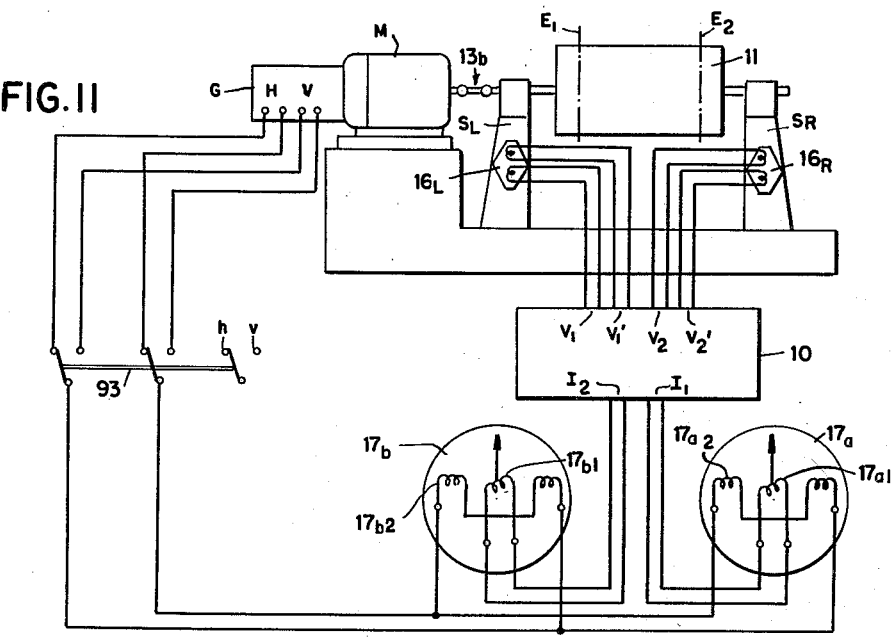

FIG. 11 exemplifies the application of circuitry according to FIG. 1 to a machine designed and set up as shown in FIGS. 1 and 2; and FIG. 12 shows part of a machine provided with means for controlling the setting of a balance correcting tool.

In balancing machines for the balance testing of workpieces below critical speed, the unbalance of the workpiece is measured in response to oscillatory forces occurring, for example, at the workpiece bearings. To afford a rapid and accurate balance correction by subsequent machining of the workpiece, the magnitudes of the unbalance components, as a rule, are determined with reference to pre-selected correction planes or correction localities of the workpiece, taking into account the spacing of these planes or localities from each other and from the points where the unbalance-responsive oscillations are sensed by suitable pickups, the latter points being hereinafter referred to as "unbalance measuring points." Transforming equations are known for such purposes, as well as devices for mechanically or electrically solving such equations.

My invention, in a more particular aspect, concerns balancing machines of the just-mentioned type wherein the unbalance of the workpiece is sensed as the effect of centrifugal force of the workpiece rotating mainly below its critical speed, and is translated into electrical voltage which—by means of a potentiometric resistance network—is divided into voltage components that are correlated to predetermined correction planes or correction localities having a given spacing from each other and a given spacing from the unbalance measuring points. The voltage components thus obtained are applied to a measuring instrument in mutually opposed relation so as to compensate those residual effects that are not to be responded to.

The invention is predicated upon incorporating into balancing equipment of the just-mentioned type a device and a performance that embody the following two equations:

$$U_1 = \frac{A'_1(d-b) - A'_2 \cdot b}{d-a-b} \quad (1)$$

$$U_2 = \frac{A_2(d-a) - A_1 \cdot a}{d-a-b} \quad (2)$$

The symbols in these equations, also used in FIGS. 1, 4 to 8 and 10, have the following meaning and—in machines according to the invention—correspond to the electric magnitudes also given presently.

$A_1$, $A'_1$—Bearing pressure at left bearing $S_L$: measuring voltage $V_1$, $V'_1$
$A_2$, $A'_2$—Bearing pressure at right bearing $S_R$: measuring voltage $V_2$, $V'_2$
$E_1$—Left reference or correction plane
$E_2$—Right reference or correction plane
$U_1$—Unbalance (cmg.) in plane $E_1$: measuring current $I_1$
$U_2$—Unbalance (cmg.) in plane $E_2$: measuring current $I_2$
$a$—Spacing of the left reference or correction plane $E_1$ from the measuring point at the left bearing $S_L$: potentiometer $R_1$
$b$—Spacing of the right reference or correction plane $E_2$ from the measuring point at the right bearing $S_R$: potentiometer $R_2$
$d$—Spacing of the bearing measuring points from each other
$d-a$—Spacing of $E_1$ from the measuring point at bearing $S_R$: potentiometer $R_3$
$d-b$—Spacing of $E_2$ from the measuring point at bearing $S_L$: potentiometer $R_4$
$d-(a+b)$—Spacing between $E_1$ and $E_2$: potentiometer $R_5$ With the aid of the Equations 1 and 2 the measurement of the unbalance magnitude can be effected—depending upon the type of journalling used for the workpiece in the balancing machine, and separate for any selected correction plane or locality of a workpiece—without requiring an appreciable amount of manual operations, nor a calculation of quotients nor the use of a computing device. Hence, such measurement can be made directly in a much simpler manner and with greater accuracy than is possible with the known machines.

While in the illustrated embodiments of the invention, the measuring instruments used for determining the unbalance magnitude furnish a visual indication, such indication is only optional in cases where these instruments are used for automatically controlling the tools or other accessories that subsequently correct the unbalance by adding or removing material from the workpiece.

By using electric resistance devices in the form of potentiometer rheostats of the helical type it has also become possible to convert the values of spacing rapidly and with particular accuracy into the corresponding values of electric resistance.

The translating device is preferably designed as a component of a balancing machine, for example, by structurally connecting it with the workpiece journalling devices of the machine and preferably by making the translating device adjustable in height for the convenience of the attendant. The setting of the potentiometers to the values of length given in the Equations 1 and 2 may be effected by hand or mechanically, and may also be performed during a balancing run of the workpiece.

Devices according to the invention are applicable for any desired workpiece arrangement on a balancing machine. That is, such devices are equally well applicable with an arrangement of the workpiece between the oscillatorily mounted journal bearings of the machine so that the correction planes or localities are also located between these bearings, as with a unilaterally journalled, i.e. "flying," workpiece, or with journalling arrangements in which one or more correction planes or localities of the workpiece are within the space between the bearings while others are outside of that space.

According to a more specific feature of my invention, I provide the balancing machine with a voltage-divider combination of potentiometers which comprises respective potentiometer rheostats for forming the electric resistance values that correspond to the spacing of each force-sensing pickup point from the respective correction planes or correction localities, and another potentiometer rheostat for forming the electric resistance value corresponding to the spacing between the correction planes or localities; and I further connect the respective resistors of the potentiometer rheostats in series with each other and in series with the measuring or control instrument that is to respond to the unbalance magnitude. As a result, the instrument automatically determines the unbalance magnitude with reference to the selected plane or locality of correction, in accordance with the quotient $$\frac{V_1 \cdot R'_4 - V_2 \cdot R'_2}{R'_5}$$

or $$\frac{V'_2 \cdot R'_3 - V'_1 \cdot R'_1}{R'_5}$$

The foregoing and other objects, advantages and features of my invention—these features being set forth with particularity in the claims annexed hereto—will be apparent from, and will be mentioned in, the following in conjunction with the embodiments illustrated on the drawings.

The balancing machine illustrated in FIGS. 1 and 2 is provided with a journalling support $S_L$ in whose bearing the above-mentioned bearing pressure $A_1$ occurs, and with another support $S_R$ in whose bearing the bearing pressure $A_2$ occurs. The two supports $S_L$ and $S_R$ are mounted on the bed or frame structure 12 of the machine and at least one of them, preferably support $S_R$, is displaceable in a direction parallel to the journalling axis. The workpiece or rotor 11 to be balance tested is placed into the two bearings in the usual manner. The predetermined correction planes of the workpiece are denoted by $E_1$ and $E_2$. The component unbalance $U_1$ occurs in plane $E_1$; and the component unbalance $U_2$ occurs in plane $E_2$. Each of the two shaft ends 11a and 11b of the workpiece 11 is journalled on a bearing bridge 14a between two rollers 14b and 14c. Each bearing bridge 14a is supported by two stiff leaf springs 15a and 15b so as to be capable of oscillatory motion in a horizontal plane. The centrifugal force occurring during the measuring run due to unbalance of the workpiece is translated into electric voltage by means of a pressure sensing device $16_R$ or $16_L$ consisting for example of a quartz-crystal pickup or other piezoelectric pickup, a resistance strain gauge or any other pickup capable of translating oscillatory changes in pressure into corresponding electric voltage from which the magnitude of the force active at the measuring point can be determined.

Also mounted on the bed or frame structure 12 of the machine is a housing 13 which encloses an electric drive M (FIG. 11). The drive comprises a disc 13a (FIG. 1) with a peripheral scale of angle-indicating indicia, and a cardanic joint 13b for connecting the drive with the workpiece 11. Mounted on top of the housing 13 is an instrument housing 17c which accommodates two measuring instruments 17a and 17b for determining the amounts of unbalance in the respective correction planes $E_1$ and $E_2$. The instruments 17a and 17b are preferably of the wattmetric type. The angular position of each unbalance can be definitely determined, for example, by the known polar-coordinate method with the aid of an auxiliary generator that supplies an alternating reference voltage synchronous with the rotation of the workpiece and whose stator is angularly adjustable in order to permit shifting the phase of the reference voltage. As an alternative, for determining the unbalance in each reference plane in the form of two Cartesian coordinates (coordinate method), a generator furnishing two sinusoidal voltages 90° phase displaced from each other may be used, the latter embodiment being shown in FIG. 11 where the generator is denoted by G.

Figure 3:
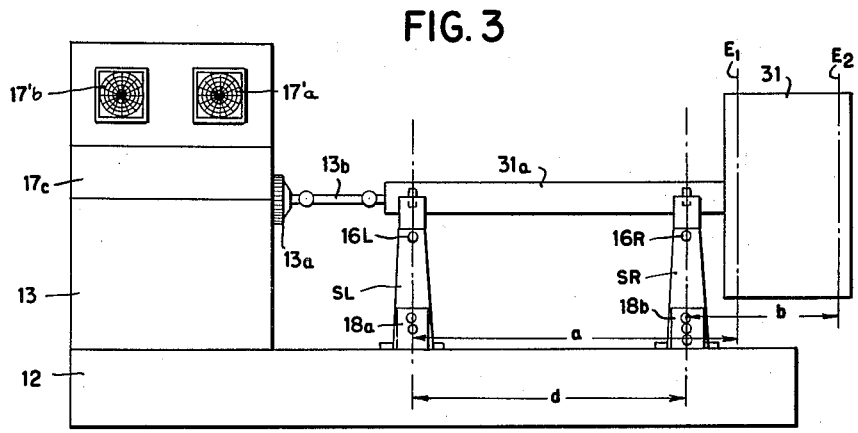
FIG. 3 shows a front view of a similar machine set up for the balancing of a rotor-workpiece unilaterally journalled in the "flying" or unilaterally journalled manner, the lateral view of this machine being as shown in FIG. 2.

The balancing machine illustrated in FIG. 3 is similar to that of FIGS. 1 and 2 but is set up for a "flying," i.e. unilaterally journalled, workpiece 31 having both correction planes $E_1$ and $E_2$ located unilaterally outside of the space between the two bearing supports $S_1$ and $S_2$. The measuring or indicating instruments 17a' and 17b' are of the vector-measuring type as illustrated and described in U.S. Patent 2,722,830. The shaft 31a of the workpiece 31 is journalled in the two oscillatorily mounted bearings of the balancing machine in the same manner as explained with reference to FIG. 1.

In FIGS. 1 and 3 the above-mentioned lengths of spacing $a$, $b$ and $d$, as well as $d-a$, $d-b$ and $d-(a+b)$ are indicated, corresponding to the symbols in Equations 1 and 2.

Mounted on the bearing supports $S_L$ and $S_R$ of the illustrated machines are respective housings 18a and 18b preferably in such a manner as to permit adjusting the height of the housings, for example with the aid of linkages as shown at 18x in FIG. 2. Mounted in housing 18a are two adjustable potentiometer rheostats. Three such potentiometer rheostats are located in housing 18b. Each potentiometer has a control knob to permit being set manually. The purpose, circuit connection and performance of these potentiometers will be described with reference to FIGS. 4 to 11.

The unbalance-responsive electric voltages $V_1$, $V'_1$ generated during the measuring run of the workpiece by respective coils 16a, 16b of pickup $16_L$ (FIG. 10), and the corresponding voltages $V_2$, $V'_2$ generated by pickup $16_R$ correspond to the bearing pressures $A_1$, $A'_1$ and $A_2$, $A'_2$ respectively. These voltages are responded to, or indicated, by the wattmetric instruments such as the two denoted by 17a and 17b in such a manner as to represent the unbalance magnitudes in the selected reference planes $E_L$ and $E_R$ respectively and will be further explained below.

Figure 10:
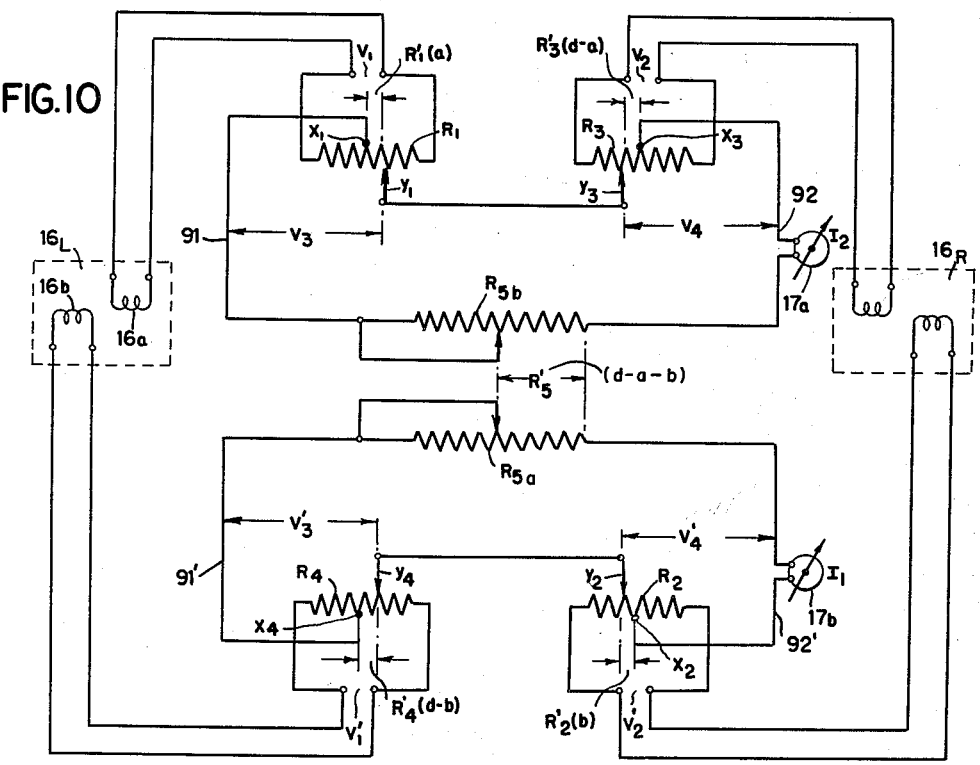
FIG. 10 is a schematic diagram of electric circuitry applicable in machines as shown in FIGS. 1 to 9.

According to FIGS. 4 and 10 an electric resistance $R'_1$ corresponding to the spacing $a$ is adjusted at potentiometer $R_1$, an electric resistance $R'_3$ corresponding to the spacing $d-a$ is adjusted at potentiometer $R_3$, an electric resistance $R'_5$ corresponding to the spacings $d-a-b$ is adjusted at potentiometer $R_5$, an electric resistance $R'_4$ corresponding to the spacing $d-b$ is adjusted at potentiometer $R_4$, and an electric resistance $R'_2$ corresponding to the spacing $b$ is adjusted at potentiometer $R_2$. Consequently the Equations 1 and 2 may also be written as follows:

(3) $$U_1 = \frac{V'_1 \cdot R'_4 - V'_2 \cdot R'_2}{R'_5}$$

and (4) $$U_2 = \frac{V_2 \cdot R'_3 - V_1 \cdot R'_1}{R'_5}$$

The resistance values $R'_1$ to $R'_5$ can be conveniently adjusted in fine graduation in accordance with the given length of spacing, particularly if the so-called helical-type potentiometers are used for this purpose. By coupling the potentiometers with each other, for example by spur gears, the adjusting operation can be simplified and facilitated.

In FIGS. 4 to 9 the respective workpieces to be balance-tested are denoted by 41, 51, 61, 71 and 81. These workpieces are journalled on the bearing supports $S_L$ and $S_R$ which, together with the potentiometer housings 18a and 18b, are adjustable horizontally relative to each other in accordance with the axial length of the particular workpiece to be tested. Mounted in the housing 18a are the helical-type potentiometers $R_1$ and $R_3$. Mounted in housing 18b are the helical-type potentiometers $R_2$, $R_4$ and $R_5$.

For adjusting these potentiometers, each of the potentiometers $R_1$ to $R_5$ has its casing provided with, or designed as, a spur gear. At the left side the spur gears $z_1$ and $z_3$ of respective potentiometers $R_1$ and $R_3$ are in meshing engagement with each other. On the right side the spur gears $z_2, z_4$, $z_5$ of respective potentiometers $R_2$, $R_4$ and $R_5$ mesh with each other. Each of potentiometers $R_3$, $R_4$ and $R_5$ is further provided with a pinion $z'_3$, $z'_4$ or $z'_5$ which is rigidly mounted on the potentiometer shaft and with whose aid the corresponding voltage taps $r_3$, $r_4$ and $r_5$ (FIG. 9) can be displaced.

The setting of the required resistance magnitudes is effected by means of racks $Z_1$ to $Z_5$. The racks $Z_1$ and $Z_2$ are displaceable in the housings 18a and 18b and mesh with the spur gears $z_1$ and $z_2$ of respective potentiometers $R_1$ and $R_2$. The racks $Z_3$ and $Z_4$ are so mounted as to remain in fixed relation to the housings 18b and 18a respectively and are in meshing engagement with the respective pinions $z'_3$ and $z'_4$. The rack $Z_5$ is slidable on its left side in the housing 18a and meshes with the spur gear $z_3$, whereas the right side of rack $Z_5$ is in meshing engagement with the pinion $z'_5$ on the shaft of potentiometer $R_5$. It is obvious that the invention may also be embodied with the aid of coupling means other than spur gears and racks, for example with the aid of transmission belt or chains.

It will be understood from FIG. 9 that the rheostat of each potentiometer has its resistance wire mounted on the inner peripheral wall of the cylindrical casing and engaged by the displaceable tap contact. In each of potentiometers $R_1$ and $R_2$ the tap contact is fixed to the stationary pivot shaft as is shown for tap contact $r_2$ in FIG. 9, so that a displacement of the tap contact relative to the rheostat wire is effected only by the rotation of the rheostat casing under control by the axial displacement of rack $Z_1$ or $Z_2$. The potentiometers $R_3$, $R_4$, $R_5$ are of similar design, but their pivot shaft carrying the tap contact is rotatable by operation of one of the respective racks $Z_3$, $Z_4$, $Z_5$ as is shown for potentiometers $R_4$ and $R_5$ in FIG. 9. Consequently, the tap contact in each of potentiometers $R_3$, $R_4$, $R_5$ is displaced relative to the rheostat by the joint, differential effect of the rotation imparted to the rheostat casing and the rotation imparted to the shaft of the tap contact.

The potentiometer $R_5$ of the illustrated embodiment is essentially a twin rheostat with two mutually insulated resistors and two mutually insulated tap contacts mechanically joined to form a single mechanical unit as is apparent from FIG. 10.

FIGS. 4 to 8 represent the adjustments of the potentiometer resistances for respectively different ways of journalling a workpiece on a balancing machine. In each case, before putting the workpiece into the bearings, the bearing supports $S_L$ and $S_R$ are placed on the bed structure 12 in such relative position as to be located beneath the proper bearing points of the workpiece to be inserted. The rack $Z_3$ participates in the displacement of bearing support $S_R$, and rack $Z_4$ participates constrainedly in the displacement of the bearing support $S_L$. As a result, during displacement of the bearing supports needed for receiving the workpiece, the length $d$ is automatically transferred by means of the pinions $z'_3$ and $z'_4$ to the tap contacts $r_3$ and $r_4$ (FIG. 9) of respective potentiometers $R_3$ and $R_4$. Simultaneously, rack $Z_5$ and the pinion $z'_5$ correspondingly displace the tap contact $r_5$ of potentiometer $R_5$.

The racks $Z_1$ and $Z_2$ are moved by the attendant in the direction indicated by an arrow in each of the illustrations (FIGS. 4 to 9), for setting the resistance values in accordance with the lengths of spacing $a$ and $b$. When thus displacing the rack $Z_1$, the housing of potentiometers $R_1$ and $R_3$ and the pinion $z'_5$ of potentiometer $R_5$ are rotated an amount corresponding to the length $a$ thus adjusting the necessary length of the resistance wire of the respective potentiometers. Now, rack $Z_5$ is thus set or blocked by the spur gear $z_3$, and the potentiometers $R_1$ and $R_3$ are likewise set or blocked in view of the fact that the respective spur gears, racks and potentiometers are constrainedly interconnected. The housing of potentiometers $R_2$, $R_4$ and $R_5$ is turned during displacement of the rack $Z_2$ an angular amount corresponding to the length $b$. As a result, the resistance values in these potentiometers are now set in accordance with length $b$. When adjusting the spacing $a$ for journalling the workpiece in the manner shown in FIG. 5, the rack $Z_5$ is displaced, during shifting of the bearing support $S_R$, a distance corresponding to the amount $a$, and rack $Z_1$ participates in this displacement.

When the adjustment of the racks, or any other coupling means as may be used instead, is completed, the required resistance magnitudes in the electric circuit between the pickups and the measuring or receiving instruments are set, so that the balance testing and thereafter the preferably automatically initiated balance correcting operation can be performed.

FIG. 9 also shows an example of an automatic, motorized adjustment of the potentiometers, relating to the devices in the housing 18b on bearing support $S_R$ of the balancing machine according to FIGS. 1 and 2. An electric motor 101 drives, through a pinion 102 and the spur-gear teeth $z_2$, the inter-coupled housings of the potentiometers $R_2$, $R_4$, $R_5$ and simultaneously displaces the rack $Z_2$ in accordance with the given value of the spacing $b$. The value $b$ may be fixed on the rack by means of a stop with whose aid the motor can be automatically switched off. Thus, in the example of FIG. 9, the rack $Z_2$, moving toward the right, to the position shown by broken lines, actuates a limit switch 94 which disconnects the drive motor 101 when rack $Z_2$ reaches the proper position corresponding to the value $b$.

A motorized device similar to that shown in FIG. 9 may also be used for setting the spacing $a$ in the housing 18a on bearing support $S_L$.

The circuit diagram of FIG. 10 shows how the potentiometers $R_1$ to $R_5$ and the measuring instruments 17a and 17b or 17a' and 17b' are interconnected. The voltage designations $V_1$, $V_2$ and $V'_1$, $V'_2$ are applied to the pairs of input terminals to which the pressure-responsive pickups $16_R$, $16_L$ are connected, these voltages being in accordance with the bearing pressures $A_1$, $A_2$ and $A'_1$, $A'_2$ of an unbalanced workpiece rotating in the machine. The potentiometers $R_1$ to $R_4$ are designed as voltage dividers. They have fixed mid-taps $x_1$ to $x_4$ and are also provided with adjustable tap contacts $y_1$ to $y_4$ for adjusting the resistance values that are to correspond to the above-mentioned lengths of spacing. The use of such potentiometers obviates the necessity of changing the set-up of the machine for different spacings of the measuring points from the bearing planes.

The potentiometer $R_5$ is preferably designed as a tandem helical-type potentiometer.

For plural-plane balancing it is generally sufficient to use a combination of three potentiometers which are adjusted, like those in housing 18$b$, by correspondingly displacing or pulling the rack $Z_2$ for each balancing pass.

When the potentiometers in the two housings 18$a$ and 18$b$ are mounted directly on the respective bearing supports $S_L$ and $S_R$, and if a series of similar workpieces are to be balance tested, then the ends of the racks $Z_1$ and $Z_2$ are so adjusted by the attendant that the correct value for the spacing $a$ or $b$ will adjust itself when the end of the rack, or a marker on the rack, being moved in the direction of the arrow indicated in FIG. 4, is pulled out up to the marking that indicates on the workpiece the reference or correction plane $E_1$ or $E_2$.

In principle, the same adjustments and operations are to take place if instead of the bilateral type of journalling according to FIG. 4, the workpiece to be tested is journalled according to FIGS. 5, 6, 7 or 8. The racks $Z_1$ and $Z_2$ in each of these cases are to be displaced in the sense indicated by the respective arrows.

Referring to a balancing of the type shown in FIGS. 1 and 4, where the workpiece and the two correction planes are located between the two bearing supports, the voltage $V_3$ in FIG. 10 between the lead 91 and the displaceable tap contact $y_1$ corresponds to the product $V_1 \cdot R'_1$ which is proportional to the spacing $a$. Under the same operating conditions the voltage $V_4$ indicated in FIG. 10 between lead 92 and tap contact $y_3$ corresponds to the product $V_2 \cdot R'_3$ which is proportional to the spacing $d-a$. Due to the series connection of the two voltages $V_3$ and $V_4$, with the series-connected resistance $R'_5$ of potentiometer $R_{5b}$ adjusted to the amount $d-(a+b)$, the current $I_2$ flowing in the measuring instrument 17$a$ (or 17'$a$) is equivalent to the unbalance magnitude $U_2$ in reference or correction plane $E_2$.

Analogously, the voltages $V'_1$ and $V'_2$ drive through the measuring instrument 17$b$ (or 17'$b$) a current $I_1$ equivalent to the unbalance magnitude $U_1$ in correction plane $E_1$.

One of the conventionally available possibilities of measuring and indicating the unbalance-responsive voltages will be explained with reference to FIG. 11 in which a balancing machine substantially as described above with reference to FIGS. 1 and 2 is provided with a potentiometric network according to FIG. 10, this network being designated as a whole by 10 in FIG. 11.

As mentioned above, the drive motor M for rotating the workpiece 11 is coupled with a generator G which produces two alternating voltages 90° phase-displaced from each other. The terminal pairs of the generator at which these two voltages are available are denoted by H and V respectively. The two instruments 17$a$ and 17$b$ connected with the potentiometer network 10 are shown in FIG. 11 as being of the wattmetric type. Each of the instruments has a moving coil 17$a$1 or 17$b$1 and a stationary field coil 17$a$2 or 17$b$2. Only the respective moving coils 17$a$1 and 17$b$1 are connected with the potentiometer network 10 according to FIG. 10 so as to be traversed by the respective currents $I_2$ and $I_1$ respectively. The field coils 17$a$2 and 17$b$2 of both instruments are connected through a two-position selector switch 93 with one of the generator voltages H, V at a time. When the switch 93 is set to position $h$, so that the field coils of both instruments 17$a$, 17$b$ are connected to voltage H of generator G, the instrument 17$b$ indicates the "horizontal" component of unbalance in the left correction plane $E_1$, and the instrument 17$a$ indicates the "horizontal" component of unbalance in the right reference or correction plane $E_2$. When the switch 93 is set to position $v$, the field coils 17$a$2 and 17$b$2 are excited by the voltage V so that the two instruments indicate the "vertical" component unbalance in the respective planes $E_1$ and $E_2$.

The two measuring instruments therefore indicate all desired unbalance magnitudes and offer the possibility of having the necessary balance-correcting machining determined or controlled by these instruments. If desired, this control can be effected automatically, for example in accordance with the method and the devices according to German Patent No. 925,255, corresponding to British Patent 789,376, published January 22, 1958.

The displacement or feed movement of the machining device used for balance correction, for example, a drilling machine or welding equipment, can be combined with the displacement of the racks $Z_1$, $Z_2$, so that the unbalance values determined by the measuring instruments 17$a$, 17$b$ and the actual correction work done at the correction localities are accurately correlated to each other.

The displaceable racks or other coupling means for setting the potentiometer resistances may also be coupled with the tools for subsequently correcting any measured unbalance of the workpiece. An embodiment of this type will be described presently with reference to FIG. 12.

FIG. 12 illustrates part of a machine as described above with reference to FIGS. 1, 2 and 3 in which the workpiece is journalled, for example, in the manner apparent from FIGS. 3 and 5. Only the right bearing support $S_R$ is shown. The shaft 31$a$ of the workpiece 31 is journalled on support $S_R$ in the manner described above with reference to FIG. 3. Mounted above the balancing machine is a supporting rail 94 on which a drilling machine 95 is horizontally displaceable. The drilling machine is coupled with rack $Z_2$ by a link 96. Consequently, any displacement of rack $Z_2$, used for setting the balance-analyzing equipment to the desired reference plane, also controls the position of the drilling tool to be subsequently used for correction of any unbalance. That is, regardless of the particular reference plane $E_1$, $E'_1$, or $E_2$ to which the rack $Z_2$ and the appertaining potentiometer may be set, the tool of the balance correcting machine 95 will always be located in the same plane.

It will be apparent from the above-described embodiments that the heretofore complicated methods and devices for such balancing work have been substituted by relatively simple means that are easy to operate. The two bearing pressures $A_1$ and $A_2$ are translated into linear voltage values, the required lengths of spacing are simultaneously translated into linear resistance values and—without major expenditure in auxiliaries and by means of an essentially automatic adjustment—are algebraically added and are simultaneously supplied, without residual moments, to the instruments that measure the current intensity and, if desired, also indicate the measured values. This simplification is essentially due to the fact that a simple characteristic equation has been made the starting point for the functioning of the apparatus and that, for solving the equation, a simple resistance network has been found which affords a direct setting of the resistances in accordance with the geometric dimensions of the workpiece.

It will be obvious to those skilled in the art, upon studying this disclosure, that my invention can be embodied in machines and by means of structural and electrical components of various type and design, and hence can be reduced to practice in apparatus other than those particularly described and illustrated herein, without departing from the essence of my invention and within the scope of the claims annexed hereto.

I claim:

1. A balancing machine comprising a frame structure, two bearing supports mounted on said frame structure and having respective oscillatorily mounted and axially aligned bearing structures for rotatably accommodating a workpiece to be balanced, one of said supports being displaceable relative to the other in a direction parallel to the bearing axis for adaptation to the workpiece, and two oscillation pickups engageable at respective sensing points with said respective bearing structures for providing respective voltages in response to oscillations due to unbalance of the workpiece; in combination with balance analyzing apparatus comprising receiving instrument means for response to workpiece unbalance relative to one of two preselected axially spaced radial reference planes of the workpiece, two potentiometer rheostats connected to said respective pickups to be energized by said respective pickup voltages and having each a fixed midtap and a displaceable tap contact for adjusting between said midtap and said tap contact a tapped-off voltage dependent upon the spacing of the sensing point of each pickup from a respective correlated reference plane, a connecting rheostat connected between said two midtaps in series with said instrument means and having a displaceable tap contact, coupling means for adjusting along said connecting rheostat a voltage drop proportional to the spacing between said correction planes, said two tapped-off voltages being poled in opposition to each other relative to said instrument means, whereby the response of said instrument means is indicative of the workpiece unbalance with reference to said one of said preselected reference planes regardless of changes in said spacings.

2. A balancing machine according to claim 1, comprising transmission means which couple all of said rheostats with said bearing supports for controlling the displacement of said tap contacts in dependence upon changes in relative position of said supports.

3. In a balancing machine according to claim 1, two of said rheostats being mounted on one of said supports and the third of said rheostats being mounted on the other of said supports, said rheostats having respective rotatable members for controlling the relative position of said respective tap contact, a setting member mounted on said one support and displaceable for selecting said respective correlated reference plane, said rotatable members of said three rheostats being ganged together with said setting member, transmission means disposed between said two supports for response to changes in spacing between said supports, one of said two potentiometer rheostats having another rotatable member for positionally controlling the tap contact of said latter potentiometer in differential relation to said first rotatable member.

4. A balancing machine for detecting the unbalance of a workpiece in two reference planes, comprising a frame structure, two bearing supports having two aligned bearings oscillatorily mounted on said bearing supports, one of said bearing structures being displaceable relative to the other in a direction parallel to the bearing axis for adaptation of the workpiece, oscillation pickup means mounted on said respective supports for providing respective voltages in response to oscillations of said bearings due to unbalance of said workpiece, a first pair of variable voltage divider means each connected to one of said pickup means, a second pair of variable voltage divider means each connected to one of said pickup means, two adjustable impedances each connecting one pair of said voltage divider means and forming a series circuit, indicator means connected in series into each series circuit, a variable coupling system connecting said bearing supports and responding to the mutual separation of said bearing supports, said coupling system being operatively connected to one voltage divider means in each pair and to said impedances so as to adjust them to a value corresponding to the separation between bearing supports, and setting means for adjusting each of said pairs of voltage divider means to a value corresponding to the respective distances between one bearing support and one of the planes, said setting means and said coupling system being linked to adjust said impedances according to the values of said distances separating the bearing supports from the respective planes.

5. A balancing machine for detecting the unbalance of a workpiece in two reference planes, comprising a frame structure, two bearing supports having two aligned bearings oscillatorily mounted on said bearing supports, one of said bearing structures being displaceable relative to the other in a direction parallel to the bearing axis for adaptation of the workpiece, oscillation pickup means mounted on said respective supports for providing respective voltages in response to oscillations of said bearings due to unbalance of said workpiece, a first pair of variable voltage divider means each connected to one of said pickup means, a second pair of variable voltage divider means each connected to one of said pickup means, two adjustable impedances each connecting one pair of said voltage divider means and forming a series circuit, indicator means connected in series into each series circuit, each voltage divider means including a resistor having a fixed mid-tap and a variable slider, said adjustable impedance means connecting said voltage divider means to each other at said fixed mid-taps, a variable coupling system connecting said bearing supports and responding to the mutual separation of said bearing supports, said coupling system being operatively connected to one voltage divider means in each pair and to said impedances so as to adjust them to a value corresponding to the separation between bearing supports, and setting means for adjusting each of said pairs of voltage divider means to a value corresponding to the respective distances between one bearing support and one of the planes, said setting means and said coupling system being linked to adjust said impedances according to the values of said distances separating the bearing supports from the respective planes.

6. A device for measuring the unbalance of a revolving body in two reference planes comprising a machine frame, two mutually-spaced displaceable bearings for the shaft of the revolving body arranged on said machine frame, oscillation pickups connected with each of said bearings for producing electrical voltages proportional to the bearing forces, a voltage divider connected with each of said transducers, said voltage dividers having a fixed mid-tap and a variable slider which is movable to both sides of said mid-tap, a variable impedance connecting said mid-taps to each other, said sliders being connected to each other, mechanical coupling means connected to the variable slider on one voltage divider and to said variable impedance for changing the resistance of said voltage divider and said variable impedance in accordance with any change in mutual spacing of said bearings, and setting means for adjusting said voltage divider means according to the position of one of said bearings relative to one of said planes, and means for measuring the unbalance in the other reference plane.

7. A balancing machine comprising a frame structure, two bearing supports mounted on said frame structure and having respective oscillatorily mounted and axially aligned bearing structures for rotatably accommodating a workpiece to be balanced, one of said supports being displaceable relative to the other in a direction parallel to the bearing axis for adaptation to the workpiece, two oscillation pickups engageable at respective sensing points with said respective bearing structures for providing respective voltages in response to oscillations due to unbalance of the workpiece; balance analyzing apparatus comprising receiving instrument means and a potentiometric resistance network connecting said pickups with said instrument means for controlling said instrument means to respond to workpiece unbalance relative to one of two selected radial axially spaced reference planes of the workpiece; said network comprising two potentiometers connected to said respective pickups and having respective tap contacts displaceable for tapping off a voltage indicative of the spacing of the sensing point of each pickup from a respective correlated reference plane, a rheostat having a displaceable tap contact, a rack-and-pinion system spanning the space between said supports and varying in response to changes in the distance between said supports, said system engaging said rheostat and said potentiometers, whereby said rheostat and said potentiometers are adjusted according to the spacing between said supports, said two tapped-off voltages being connected in mutually opposed series relation to said instrument means and in series with said rheostat and said instrument means, whereby said instrument means respond to the workpiece unbalance with reference to said selected one reference plane.

8. A balancing machine comprising a frame structure, two bearing supports mounted on said frame structure and having respective oscillatorily mounted and axially aligned bearing structures for rotatably accommodating a workpiece to be balanced, one of said supports being displaceable relative to the other in a direction parallel to the bearing axis for adaptation to the workpiece, two oscillation pickups engageable at respective sensing points with said respective bearing structures for providing respective voltages in response to oscillations due to unbalance of the workpiece; balance analyzing apparatus comprising receiving instrument means and a potentiometric resistance network connecting said pickups with said instrument means for controlling said instrument means to respond to workpiece unbalance relative to one of two selected radial axially spaced reference planes of the workpiece; said network comprising two potentiometers connected to said respective pickups and having respective tap contacts displaceable for tapping off a voltage indicative of the spacing of the sensing point of each pickup from a respective correlated reference plane, a rheostat having a displaceable tap contact, a group of geared racks spanning the space between said supports, a plurality of pinion gears engaging the racks and turning in response to the distance between the supports, said gears engaging said rheostat and said potentiometer, whereby said rheostat and said potentiometer are adjusted according to the spacing between said supports, said two tapped-off voltages being connected in mutually opposed series relation to said instrument means and in series with said rheostat and said instrument means, whereby said instrument means respond to the workpiece unbalance with reference to said selected one reference plane.

9. A balancing machine comprising a frame structure, two bearing supports mounted on said frame structure and having respective oscillatorily mounted and axially aligned bearing structures for rotatably accommodating a workpiece to be balanced, one of said supports being displaceable relative to the other in a direction parallel to the bearing axis for adaptation to the workpiece, and two oscillation pickups engageable at respective sensing points with said respective bearing structures for providing respective voltages in response to oscillations due to unbalance of the workpiece; in combination with balance analyzing apparatus comprising receiving instrument means for response to workpiece unbalance relative to one of two pre-selected axially spaced radial reference planes of the workpiece, two potentiometer rheostats connected to said respective pickups to be energized by said respective pickup voltages and having each a fixed mid-tap and a displaceable tap contact for adjusting between said mid-tap and said tap contact a tapped-off voltage dependent upon the spacing of the sensing point of each pickup from a respective correlated reference plane, a connecting rheostat connected between said two mid-taps in series with said instrument means and having a displaceable tap contact, a rack-and-pinion system spanning the space between said supports and varying in response to changes in the distance between said supports, said system engaging said rheostats, whereby said rheostats are adjusted according to the spacing between said supports, said two tapped-off voltages being poled in opposition to each other relative to said instrument means, whereby the response of said instrument means is indicative of the workpiece unbalance with reference to said one of said pre-selected reference planes regardless of changes in said spacings.

10. A balancing machine comprising a frame structure, two bearing supports mounted on said frame structure and having respective oscillatorily mounted and axially aligned bearing structures for rotatably accommodating a workpiece to be balanced, one of said supports being displaceable relative to the other in a direction parallel to the bearing axis for adaptation to the workpiece, and two oscillation pickups engageable at respective sensing points with said respective bearing structures for providing respective voltages in response to oscillations due to unbalance of the workpiece; in combination with balance analyzing apparatus comprising receiving instrument means for response to workpiece unbalance relative to one of two pre-selected axially spaced radial reference planes of the workpiece, two potentiometer rheostats connected to said respective pickups to be energized by said respective pickup voltages and having each a fixed mid-tap and a displaceable tap contact for adjusting between said mid-tap and said tap contact a tapped-off voltage dependent upon the spacing of the sensing point of each pickup from a respective correlated reference plane, a connecting rheostat connected between said two mid-taps in series with said instrument means and having a displaceable tap contact, a group of geared racks spanning the space between said supports, a plurality of pinion gears engaging the racks and turning in response to the distance between the supports, said gears engaging said rheostats, whereby said rheostats are adjusted according to the spacing between said supports, said two tapped-off voltages being poled in opposition to each other relative to said instrument means, whereby the response of said instrument means is indicative of the workpiece unbalance with reference to said one of said pre-selected reference planes regardless of changes in said spacings.

11. A device for measuring the unbalance of a revolving body in two reference planes comprising a machine frame, two mutually displaceable bearings for the shaft of the revolving body arranged on said machine frame, oscillation pickups connected with each of said bearings for producing electrical voltages proportional to the bearing forces, a voltage divider connected with each of said pickups, said voltage dividers having a fixed mid-tap and a variable slider member, a circuit connecting said respective slider members and respective mid-taps to each other, a variable impedance means connected into said circuit in series with the taps and slider members, said voltage dividers being mounted on one of said bearings, and having a resistor member upon which said mid-tap is fixed and relative to which said slider member is variable on each side of said tap, said members on one divider both being movable relative to said one bearing, one of said members on the other divider being movable relative to the one bearing, mechanical coupling means engaging one member on one divider to said impedance means and engaging another of said members to the other bearing for changing the resistance of said voltage divider and said variable impedance means in accordance with any change in mutual spacing of said bearings, and setting means for adjusting said voltage dividers according to the relative position of one of said bearings to one of said planes, and means for measuring the unbalance of the revolving body in the other reference plane.

12. A balancing machine comprising a frame structure, two bearing supports mounted on said frame structure and having respective oscillatorily mounted and axially aligned bearing structures for rotatably accommodating a workpiece to be balanced, one of said supports being displaceable relative to the other in a direction parallel to the bearing axis for adaptation to the workpiece, two oscillation pickups engageable at respective sensing points with said respective bearing structures for providing respective voltages in response to oscillations due to unbalance of the workpiece; balance analyzing apparatus comprising receiving instrument means and a potentiometric resistance network connecting said pickups with said instrument means for controlling said instrument means to respond to workpiece unbalance relative to one of two selected radial axially spaced reference planes of the workpiece; said network comprising two potentiometers connected to said respective pickups and having respective tap contacts displaceable for tapping off a voltage indicative of the spacing of the sensing point of each pickup from a respective correlated reference plane, a rheostat having a displaceable tap contact, mechanical coupling means for adjusting along said rheostat a voltage drop indicative of the spacing between said two reference planes, said two tapped-off voltages being connected in mutually opposed series relation to said instrument means and in series with said rheostat and said instrument means, whereby said instrument means respond to the workpiece unbalance with reference to said selected one reference plane, a drive motor mechanically connected with said two potentiometers and with said rheostat for adjusting said tapped-off voltages and said voltage drop, a movable stop control member also connected with said motor to be driven therefrom, and limit switch means positionally adjustable in accordance with one of said selected reference planes and engageable by said member to stop said drive motor when said member reaches a position indicative of said plane.

References Cited in the file of this patent

UNITED STATES PATENTS

| | | |
|---|---|---|
| 2,235,393 | Baker | Mar. 18, 1941 |
| 2,706,399 | Federn | Apr. 19, 1955 |
| 2,730,899 | Hellar et al. | Jan. 17, 1956 |
| 2,731,834 | Fehr et al. | Jan. 24, 1956 |
| 2,748,603 | Wilcox | June 5, 1956 |
| 2,815,666 | Pischel | Dec. 10, 1957 |
| 2,816,463 | Budington et al. | Dec. 17, 1957 |
| 2,962,899 | Weisse et al. | Dec. 6, 1960 |
| 2,980,331 | Gruber et al. | Apr. 18, 1961 |

FOREIGN PATENTS

| | | |
|---|---|---|
| 956,047 | France | July 11, 1949 |